US012726126B2

(12) United States Patent
Tan

(10) Patent No.: US 12,726,126 B2
(45) Date of Patent: Sep. 1, 2026

(54) MULTIPHASE SWITCHING CONVERTER AND CONTROL CIRCUIT THEREOF

(71) Applicant: SG MICRO CORP, Beijing (CN)

(72) Inventor: Lei Tan, Beijing (CN)

(73) Assignee: SG MICRO CORP, Beijing (CN)

( * ) Notice: Subject to any disclaimer, the term of this patent is extended or adjusted under 35 U.S.C. 154(b) by 337 days.

(21) Appl. No.: 18/702,856

(22) PCT Filed: Aug. 18, 2022

(86) PCT No.: PCT/CN2022/113210
§ 371 (c)(1),
(2) Date: Apr. 19, 2024

(87) PCT Pub. No.: WO2023/071439
PCT Pub. Date: May 4, 2023

(65) Prior Publication Data

US 2025/0132682 A1 Apr. 24, 2025

(30) Foreign Application Priority Data

Oct. 28, 2021 (CN) ......................... 202111261865.X

(51) Int. Cl.

| | |
|---|---|
| ***H02M 3/158*** | (2006.01) |
| ***H02M 1/084*** | (2006.01) |
| *H02M 1/00* | (2006.01) |

(52) U.S. Cl.
CPC ....... *H02M 3/1584* (2013.01); *H02M 1/0845* (2013.01); *H02M 3/1586* (2021.05); *H02M 1/0032* (2021.05); *H02M 1/0048* (2021.05)

(58) Field of Classification Search
CPC ............. H02M 3/1584; H02M 1/0845; H02M 3/1586; H02M 1/0032; H02M 1/0048; H02M 1/088; Y02B 70/10
See application file for complete search history.

(56) References Cited

U.S. PATENT DOCUMENTS 8,493,044 B2 * 7/2013 Xu ...................... H02M 3/1584 323/282
9,071,142 B2 6/2015 Yang et al.
(Continued)

FOREIGN PATENT DOCUMENTS

CN 103280974 B 9/2015
CN 108011518 A 5/2018
(Continued)

OTHER PUBLICATIONS

International Search Report (including English translation) and Written Opinion for International Application No. PCT/CN2022/113210, dated Oct. 10, 2022, 8 pages.
(Continued)

*Primary Examiner* — Yusef A Ahmed
(74) *Attorney, Agent, or Firm* — Westman, Champlin & Koehler, P.A.

(57) ABSTRACT

The present disclosure provides a multiphase switching converter and control circuit thereof. The multiphase switching converter includes a plurality of control circuits forming a daisy chain architecture, and to generate a preparatory output signal and a switching control signal for controlling a corresponding switching circuit when receiving a clock signal from a communication bus in the preparatory state, the control circuit is configured to operate in a preparatory state when receiving a preparatory input signal. Only preparatory signals are transmitted between the plurality of control circuits, and a signal for controlling circuit being on is participated by the clock signal generated by a host controller, so that the host controller does not need to track a position of a current unit in real time during a control process of all units, thus greatly simplifying a design of the host controller and reducing a circuit cost.

10 Claims, 3 Drawing Sheets

(56) References Cited

U.S. PATENT DOCUMENTS 9,941,781 B2* 4/2018 Hu ........................ H02M 1/084
10,044,255 B2 8/2018 Sreenivas et al.
10,148,177 B2* 12/2018 Herzer .................. H02M 3/158
10,270,343 B2* 4/2019 Nguyen .............. H02M 3/1584
10,498,237 B1* 12/2019 Lin ....................... H02M 3/158
11,329,556 B1* 5/2022 Yang ..................... H02M 3/155
11,356,023 B2 6/2022 Jiang et al.
11,545,902 B2 1/2023 Luo
11,621,640 B2* 4/2023 Huang ................ H02M 3/1586 323/271
11,811,325 B2 11/2023 Jiang et al.
2005/0083024 A1* 4/2005 Harris ................. H02M 3/1584 323/282
2012/0068674 A1* 3/2012 Yu ....................... H02M 3/1584 323/271
2013/0307498 A1* 11/2013 Jiang ......................... G05F 1/10 323/271
2013/0342176 A1 12/2013 Yang et al.
2014/0266111 A1* 9/2014 Lee ..................... H02M 3/1584 323/282
2015/0236580 A1* 8/2015 Jiang ..................... H03L 7/0814 327/150
2018/0123443 A1 5/2018 Sreenivas et al.
2021/0028683 A1* 1/2021 Jiang ..................... H02M 1/084
2021/0028686 A1* 1/2021 Jiang ................... H02M 3/1584
2021/0028704 A1* 1/2021 Jiang ................... H02M 3/1584
2021/0288578 A1* 9/2021 Luo ........................ H02M 1/088
2021/0288579 A1* 9/2021 Luo ..................... H02M 1/0845
2021/0288580 A1* 9/2021 Luo ..................... H02M 3/1584
2022/0038008 A1* 2/2022 Wu ........................ H02M 1/088
2022/0247316 A1* 8/2022 Jiang ................... H02M 3/1584
2022/0247317 A1* 8/2022 Jiang ................... H02M 3/1584
2022/0321013 A1* 10/2022 Chen ..................... H02M 1/088
2023/0238875 A1* 7/2023 Yang ................... H02M 3/1586 363/13
2023/0336082 A1* 10/2023 Dai ......................... H02M 1/32
2024/0063720 A1* 2/2024 Yang ..................... H02M 1/088

FOREIGN PATENT DOCUMENTS

CN 110445380 A 11/2019
CN 111313665 A 6/2020
CN 112865498 A 5/2021
CN 114696614 A 7/2022
CN 116054569 A 5/2023
JP 2017221006 A 12/2017

OTHER PUBLICATIONS

First Office Action, including Search Report, for Chinese Patent Application No. 202111261865.X, dated Mar. 1, 2024, 24 pages.

* cited by examiner

MULTIPHASE SWITCHING CONVERTER AND CONTROL CIRCUIT THEREOF

CROSS-REFERENCE TO RELATED APPLICATION

This application is a Section 371 National Stage application of International application NO. PCT/CN2022/113210, which is filed on Aug. 18, 2022 and published as WO/2023/071439A1 on May 4, 2023, and claims priority to the Chinese Patent Application No. 202111261865.X, filed on Oct. 28, 2021, entitled "multiphase switching converter and control circuit thereof", which are incorporated herein by reference in their entireties in this disclosure.

FIELD OF TECHNOLOGY

The present disclosure relates to a technical field of power supply, and in particular, to a multiphase switching converter and a control circuit thereof.

DESCRIPTION OF THE RELATED ART

An exponential growth of Internet of Things (IoT) cloud service scale is driving significant advances in data centers, networks, and telecom equipment. At the same time, increasing data and information pose new challenges to a processing efficiency of data center servers. Therefore, how to efficiently supply power and heat for these devices while minimizing power consumption has become an important topic in a technical field of power supply in conventional.

Multiphase switching converter is a technology that connects a plurality of switching circuits in parallel and distributes switching modulation processes to different phases to achieve adjustment and control of power supply. The phase-to-phase pulse width modulation (PWM) signals in the multiphase power supply can be identical or staggered by some phase, so that a fluctuation frequency of output and input is a product of a switching frequency in each phase and the number of phases, thereby reducing the need for filter capacitors and reducing the current impact on the input, and speeding up the response to load changes. Multiphase switching converter is widely used in power supply solutions of high-performance CPU because of its superior performance.

For multiphase switching converter with a single controller, if a load current demand increases, the number of phases of the converter needs to be increased correspondingly, and the logic, circuit, control circuit structure and size of the controller need to be adjusted accordingly, which, undoubtedly increases the development difficulty and overall cost of the system greatly.

SUMMARY

In view of the above problems, an objective of the present disclosure is to provide a multiphase switching converter and a control circuit thereof.

According to an aspect of the present disclosure, there is provided a multiphase switching converter, including: a plurality of switching circuits coupled in parallel, wherein each switching circuit has an input coupled to an input voltage and an output coupled to a load to provide an output voltage; and a plurality of control circuits configured in a daisy chain architecture, respectively coupled to the plurality of switching circuits, wherein each control circuit has a first terminal, a second terminal and a third terminal, the first terminal is coupled to the second terminal of a pre-stage control circuit to receive a preparatory input signal, the second terminal is coupled to the first terminal of a post-stage control circuit to provide a preparatory output signal, and the third terminal is coupled to a communication bus to receive a clock signal, wherein each control circuit is configured to operate in a preparatory state when receiving the preparatory input signal, and to generate the preparatory output signal and a switching control signal for controlling a corresponding switching circuit when receiving the clock signal in the preparatory state.

Optionally, the first terminal of a head control circuit of the plurality of control circuits and the second terminal of a tail control circuit of the plurality of control circuits are coupled to a loopback wire, so as to form a cyclic chain including the plurality of control circuits.

Optionally, the switching control signal has a high-level state, a low-level state and an intermediate-level state, and the corresponding switching circuit performs actions including turning on an upper transistor, turning on a lower transistor and being in a high-resistance state in response to the high-level state, the low-level state and the intermediate-level state of the switching control signal.

Optionally, the preparatory input signal includes an on-preparatory input signal and a freewheeling preparatory input signal.

Optionally, the preparatory output signal includes an on-preparatory output signal and a freewheeling preparatory output signal.

Optionally, the clock signal includes an on-clock signal and a freewheeling clock signal.

Optionally, each control circuit includes: a configuration register, configured to configure whether the corresponding control circuit is in a cyclic chain, whether the corresponding control circuit is a head control circuit and whether the corresponding control circuit is a tail control circuit.

Optionally, each control circuit includes: a reset controller, configured to transmit a state feedback signal to a host controller through the communication bus, the host controller is configured to judge whether only one control circuit in a cyclic chain is in the preparatory state according to the state feedback signal, wherein the reset controller receives a reset signal from the host controller through the communication bus and executes circuit reset when no or more than one control circuit in the cyclic chain is in the preparatory state.

Optionally, each control circuit includes: a counter, configured to count pulses of the clock signal in the preparatory state, obtain a total phase number in the cyclic chain at the current time, and transmit the total phase number to a host controller through the communication bus.

Optionally, each control circuit includes: a phase-cutting controller, configured to receive a phase-cutting instruction from a host controller through the communication bus in the preparatory state, and judge whether to make the corresponding switching circuit stop outputting power or start to output power based on the phase-cutting instruction.

Optionally, each control circuit includes: a detection and control module, configured to compare a current sampling signal of the corresponding switching circuit with a current threshold value to obtain a comparison result, judge whether an inductor current in the corresponding switching circuit is reversed according to the comparison result, and transmit an inductor current reverse indication signal to a host controller through the communication bus.

Optionally, the detection and control module is further configured to receive a threshold setting signal from the host controller through the communication bus and set the current threshold according to the threshold setting signal.

According to another aspect of the present disclosure, there is provided a control circuit for a multiphase switching converter, and the control circuit is coupled with other control circuits to form a daisy chain architecture, the multiphase switching converter includes a plurality of switching circuits coupled in parallel, the control circuit includes: a first terminal coupled to a second terminal of a pre-stage control circuit in the daisy chain architecture to receive a preparatory input signal; a second terminal coupled to a first terminal of a post-stage control circuit in the daisy chain architecture to provide a preparatory output signal; and a third terminal coupled to a communication bus to receive a clock signal, wherein, the control circuit is configured to operate in a preparatory state when receiving the preparatory input signal, and to generate the preparatory output signal and a switching control signal for controlling a corresponding switching circuit when receiving the clock signal in the preparatory state.

Optionally, the first terminal of the control circuit is coupled to a loopback wire when the control circuit serves as a head control circuit in the daisy chain architecture, and the second terminal of the control circuit is coupled to the loopback wire when the control circuit serves as a tail control circuit in the daisy chain architecture, so as to form a cyclic chain including the control circuit and a plurality of other control circuits.

Optionally, the switching control signal has a high-level state, a low-level state and an intermediate-level state, and the corresponding switching circuit performs actions including turning on an upper transistor, turning on a lower transistor and being in a high-resistance state in response to the high-level state, the low-level state and the intermediate-level state of the switching control signal.

Optionally, the preparatory input signal includes an on-preparatory input signal and a freewheeling preparatory input signal.

Optionally, the preparatory output signal includes an on-preparatory output signal and a freewheeling preparatory output signal.

Optionally, the clock signal includes an on-clock signal and a freewheeling clock signal.

Optionally, the control circuit further includes: a configuration register, configured to configure whether the corresponding control circuit is in a cyclic chain, whether the corresponding control circuit is a head control circuit and whether the corresponding control circuit is a tail control circuit.

Optionally, the control circuit further includes: a reset controller, configured to transmit a state feedback signal to a host controller through the communication bus, the host controller is configured to judge whether only one control circuit in a cyclic chain is in the preparatory state according to the state feedback signal, wherein the reset controller receives a reset signal from the host controller through the communication bus and executes circuit reset when no or more than one control circuit in the cyclic chain is in the preparatory state.

Optionally, the control circuit further includes: a counter, configured to count pulses of the clock signal in the preparatory state, obtain a total phase number in the cyclic chain at a current time, and transmit the total phase number to a host controller through the communication bus.

Optionally, the control circuit further includes: a phase-cutting controller, configured to receive a phase-cutting instruction from a host controller through the communication bus in the preparatory state, and judge whether to make the corresponding switching circuit stop outputting power or start to output power based on the phase-cutting instruction.

Optionally, the control circuit further includes: a detection and control module, configured to compare a current sampling signal of the corresponding switching circuit with a current threshold value to obtain a comparison result, judge whether an inductor current in the corresponding switching circuit is reversed according to the comparison result, and transmit an inductor current reverse indication signal to a host controller through the communication bus.

Optionally, the detection and control module is further configured to receive a threshold setting signal from the host controller through the communication bus and set the current threshold according to the threshold setting signal.

The multiphase switching converter provided by embodiments of the present disclosure includes the plurality of control circuits forming the daisy chain architecture, wherein the control circuit is configured to operate in a preparatory state when receiving a preparatory input signal, and to generate a preparatory output signal and a switching control signal for controlling a corresponding switching circuit when receiving a clock signal from a communication bus in the preparatory state. Since the daisy chain architecture is adopted, users can easily adjust the total phase number of multiphase switch according to the needs of specific applications. If the phase number needs to be increased, it only needs to add new control circuit and corresponding external components in the daisy chain architecture.

Further, only preparatory signals are transmitted between the plurality of control circuits, and a control signal for turning on the circuit is participated by the clock signal generated by a host controller, so that the host controller does not need to track a position of a current unit in real time during a control process of all units, thus greatly simplifying a design of the host controller and reducing a circuit cost.

Further, the multiphase switching converter of embodiments of the resent disclosure adopts a unified and simple chip or circuit to construct the cyclic chain, which only requires the control circuits in the cyclic chain to keep sequence, but does not require them to be connected in sequence, so as to simplify the difficulty of circuit modification and greatly reduce the circuit cost.

BRIEF DESCRIPTION OF THE DRAWINGS

Through the following description of the embodiments of the present disclosure with reference to the accompanying drawings, the above and other objectives, features, and advantages of the present disclosure will be more apparent, in the accompanying drawings.

DETAILED DESCRIPTION OF THE DISCLOSURE

Figure 1:
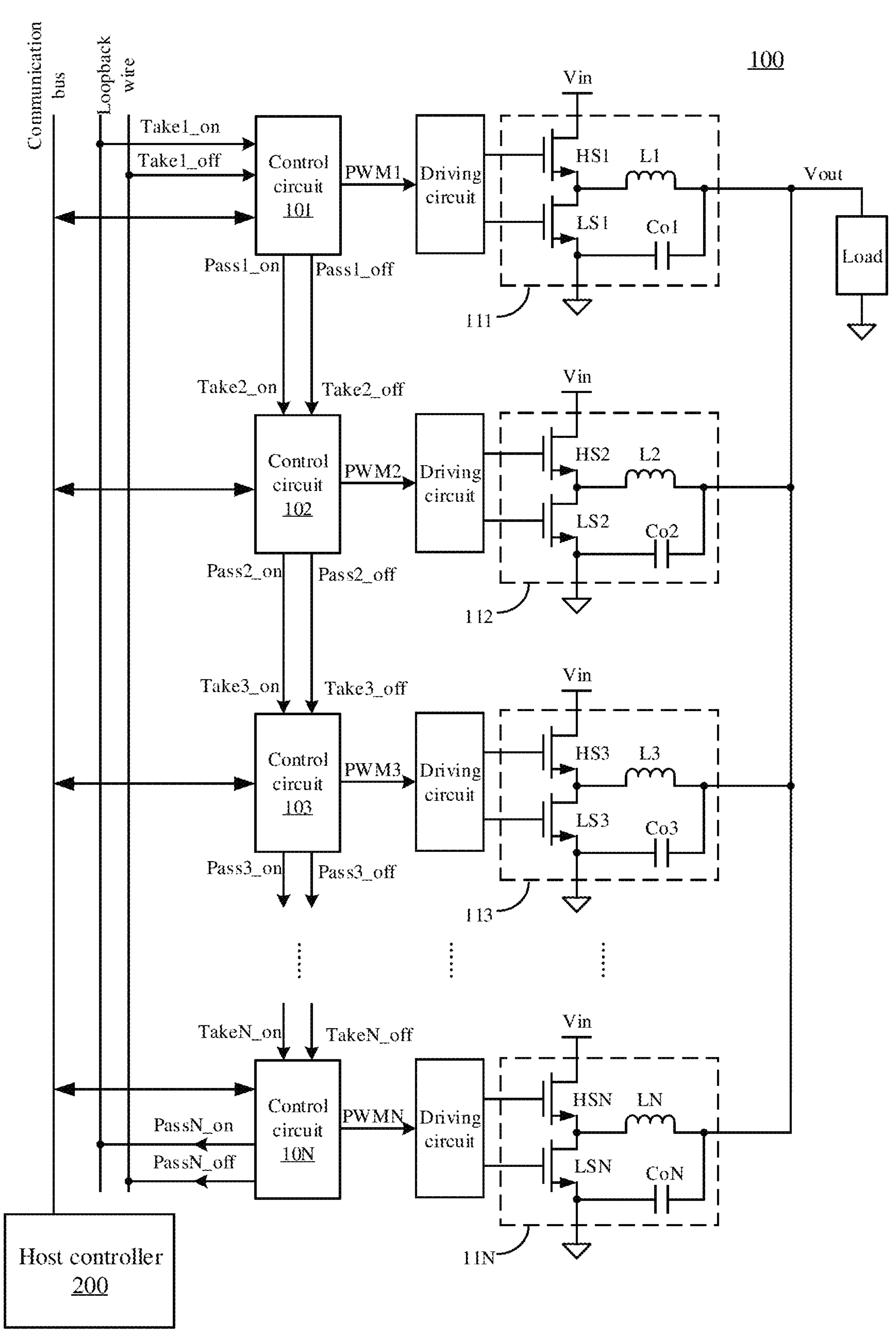
FIG. 1 is a schematic block diagram of a multiphase switching converter 100 according to an embodiment of the present disclosure.

Specific embodiments of the present disclosure will be described in detail below with reference to the accompanying drawings and it should be noted that the embodiments described herein are for illustration only and are not intended to limit the present disclosure. In the following description, in order to facilitate a thorough understanding of the present disclosure, a large number of specific details are elaborated. However, those of ordinary skill in the art will appreciate that these specific details are not necessary to implement the present disclosure. Furthermore, in some embodiments well-known circuits materials or methods are not specifically described in order to avoid obfuscating the present disclosure.

Throughout the specification, references to "an embodiment", "an embodiment", "an example" or "example" mean that particular features, structures or characteristics described in connection with the embodiment or example are included in at least one embodiment of the present disclosure. Incidentally, the phrases "in an embodiment", "in an embodiment", "an example", or "example" appearing throughout the specification do not necessarily all refer to the same embodiment or example. Further, particular features structures or characteristics may be combined in one or more embodiments or examples in any suitable combination and/or sub-combination. Furthermore, it will be understood by those of ordinary skill in the art that the figures provided herein are all for purposes of illustration in which like reference numerals refer to like elements. It should be understood that when an element is called "connected" or "coupled" to another element, it may be directly connected or coupled to another element or an intermediate element may be present. Conversely, when an element is said to be "directly connected" or "directly coupled" to another element, there is no intermediate element. In addition, the synchronous or equal signals referred to in the specification may have a little time difference between each other in practical application due to the delay caused by signal processing.

FIG. 1 is a schematic block diagram of a multiphase switching converter 100 according to an embodiment of the present disclosure. The multiphase switching converter 100 includes switching circuits 111~11N (N is an integer greater than 1) coupled in parallel, and control circuits 101~10N forming a daisy chain architecture. Wherein, each switching circuit has an input coupled to an input voltage Vin and an output coupled to a load to provide an output voltage Vout. The control circuits 101~10N are coupled to switching circuits 111~11N, respectively. Each control circuit 10*i* (i=1, 2, . . . , N) has a first terminal, a second terminal and a third terminal. The first terminal is coupled to the second terminal of a pre-stage control circuit to receive an on-preparatory input signal Takei_on and a freewheeling preparatory input signal Takei_off. The second terminal is coupled to the first terminal of a post-stage control circuit to provide an on-preparatory output signal Passi_on and a freewheeling preparatory output signal Passi_off. The third terminal is coupled to a communication bus to receive an on-clock signal CP_on and a freewheeling clock signal CP_off (not shown). The control circuit 10*i* is configured to enter a preparatory state when receiving preparatory input signals Takei_on and Takei_off, and to generate preparatory output signals Passi_on and Passi_off and a switching control signal PWMi for controlling the corresponding switching circuit 11*i* when detecting pulses of clock signals CP_on and CP_off in the preparatory state. In some embodiments, the switching circuit 11*i* is a synchronous buck circuit including an upper transistor HSi, a lower transistor LSi, an inductor Li and an output capacitor Coi. The switching control signal PWMi has three level states. When the switching control signal PWMi is in a high-level state, the upper transistor HSi is turned on and the lower transistor LSi is turned off; when switching control signal PWMi is in a low-level state, the upper transistor HSi is turned off and the lower transistor LSi is turned on; when the switching control signal PWMi is in an intermediate-level state, a freewheeling diode of the upper transistor HSi is in a high-resistance state, which makes an output current drop rapidly.

In some embodiments, control circuit 10*i* enters an on-preparatory state when receiving the on-preparatory input signal Takei_on. The preparatory state refers to a state in that the control circuit 10*i* is operated in a state between off and fully on. The control circuit 10*i* generally completes the configuration of relevant parameters and settings in the preparatory state, while the control circuit 10*i* also judges whether a pulse of the clock signal CP_on is detected in the on-preparatory state. When the pulse of clock signal CP_on is detected, the control circuit 10*i* turns on and enters an on state, and outputs the on-preparatory output signal Passi_on and the switching control signal PWMi at the high-level state, so that the upper transistor HSi in the switching circuit 11*i* is turned on and the lower transistor LSi in the switching circuit 11*i* is turned off. When the control circuit 10*i* receives the freewheeling preparatory input signal Takei_off, the control circuit 10*i* enters a freewheeling preparatory state, at the same time, the control circuit 10*i* judges whether the freewheeling clock signal CP_off is detected in the freewheeling preparatory state. When the freewheeling clock signal CP_off is detected, control circuit 10*i* enters a freewheeling state, and outputs the freewheeling preparatory output signal Passi_off and the switching control signal PWMi at low-level state, so that the upper transistor HSi in the switching circuit 11*i* is turned off and the lower transistor LSi in the switching circuit 11*i* is turned on.

Generally, the switching control signals PWM1~PWMN are synchronized with the pulses of on-clock signal CP_on and freewheeling clock signal CP_off, respectively. For example, a rising edge of switching control signal PWMi is synchronized with the on-clock signal CP_on, so that the upper transistor HSi is turned on and the lower transistor LSi is turned off when the on-clock signal CP_on is detected; a falling edge of the switching control signal PWMi is synchronized with the freewheeling clock signal CP_off, so that when the freewheeling clock signal CP_off is detected, the upper transistor HSi is turned off and the lower transistor LSi is turned on, and the corresponding switching circuit 11*i* is triggered to provide output power to the load. In some embodiments, duty cycles of the switching control signals PWM1~PWMN are regulated according to a time interval between the on-clock signal CP_on and the freewheeling clock signal CP_off.

In some embodiments, a first terminal of a head control circuit of the plurality of control circuits 101~10N and a second terminal of a tail control circuit of the plurality of control circuits 101~10N are coupled to a loopback wire to form a cyclic chain including the plurality of control circuits 101~10N. Any one of the plurality of control circuits 101~10N can be used as the head control circuit and the tail control circuit without corresponding to its physical position in the daisy chain architecture. When a control circuit is configured as the head control circuit or the tail control circuit, it only needs to be connected to the loopback wire through internal logic to form a cyclic chain. The control circuits in the cyclic chain are only required to keep sequence, and are not required to be connected in sequence, so that the convenience of designing circuits according to specific applications can be greatly improved.

Since the daisy chain architecture is adopted, users can easily adjust the total phase number of multiphase switch according to the needs of specific applications. If the phase number needs to be increased, it only needs to add new control circuit and corresponding external components in the daisy chain architecture. Further, only preparatory signals are transmitted between the plurality of control circuits in the cyclic chain, and a signal for controlling circuit being on is participated by the clock signal generated by a host controller 200, so that the host controller 200 does not need to track a position of a current unit in real time during a control process of all units, thus greatly simplifying a design of the host controller and reducing a circuit cost.

In an embodiment, each control circuit is coupled to the communication bus to communicate with the host controller 200 through the communication bus. The host controller 200 can judge whether only one control circuit in the current cyclic chain is in the preparatory state according to a state feedback signal send by each control circuit, and execute circuit reset according to a judgment result. Or the host controller 200 determines whether to carry out phase-cutting according to a current sampling signal transmitted by each control circuit, the total phase number in the current cyclic chain and/or a load current, and generates a phase-cutting instruction. Each control circuit receives a phase-cutting instruction from the host controller 200 through the communication bus, and determines whether to make the corresponding switching circuit stop outputting power or start to output power of according to the phase-cutting instruction, so that the preparatory input signal equals to the preparatory output signal while the corresponding switching circuit is controlled to stop outputting power.

The communication bus here may be Inter-Integrated Circuit (I2C), Serial Peripheral Interface (SPI), Serial Communication Interface (SCI), Universal Asynchronous Receiver/Transmitter (UART), Controller Area Network (CAN) and other common buses. When I2C bus is used, Power Management Bus (PMBUS) or System Management Bus (SMBUS) protocol can be applied.

Figure 2:
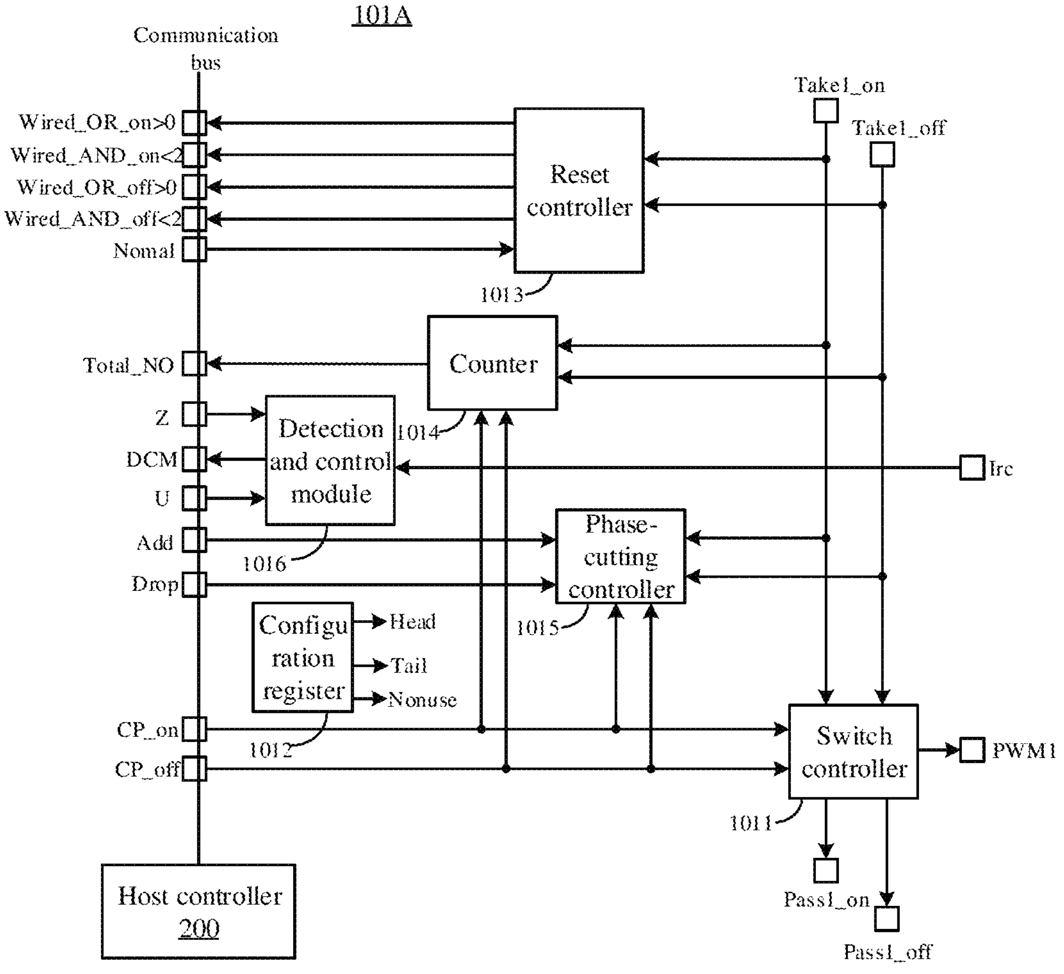
FIG. 2 is a schematic block diagram of a control circuit 101A according to an embodiment of the present disclosure.

FIG. 2 is a schematic block diagram of a control circuit 101A including a switch controller 1011 and a configuration register 1012 according to an embodiment of the present disclosure. The switch controller 1011 generates an on-preparatory output signal Pass1_on according to the on-preparatory input signal Take1_on and the on-clock signal CP_on, and outputs the switching control signal PWM1 at a high-level state. The switch controller 1011 generates a freewheeling preparatory output signal Passi_off according to the freewheeling preparatory input signal Take1_off and the freewheeling clock signal CP_off, and outputs the switching control signal PWM1 at a low level state.

The configuration register 1012 is configured to configure whether a control circuit 101A is in the cyclic chain (corresponding to Nonuse bit), is the head control circuit (corresponding to Head bit), and is the tail control circuit (corresponding to Tail bit). When the configuration register 1012 is configured to be in the Nonuse bit, the control circuit 101A is not in the cyclic chain, and the circuit is short-circuited, which is only used for transmitting the preparatory signal, even if the preparatory input signal is equal to the preparatory output signal. When the configuration register 1012 is configured to be in the Head bit, the first terminal of the control circuit 101A couples to the loopback wire through internal logic. When the configuration register 1012 is configured to be in the Tail bit, the second terminal of the control circuit 101A couples to the loopback wire through internal logic.

In some embodiments the control circuit 101A further includes a reset controller 1013. The reset controller 1013 is configured to transmit the state feedback signal Wired_OR_on>0, Wired_AND_on<2, Wired_OR_off>0 and Wired_AND_off<2 to the host controller through the communication bus. The host controller 200 judges whether only one control circuit in the cyclic chain is in the preparatory state according to the state feedback signal. When there is no or more than one control circuit in the cyclic chain being in the preparatory state, the host controller 200 provides a reset signal (i.e., a signal Nomal is at a low level) to the head control circuit through the communication bus. The reset controller 1013 of the head control circuit performs circuit reset based on the reset signal and restarts the whole cyclic chain. Here, Wired_OR_on>0 and Wired_OR_off>0 indicate whether there is a control circuit in the current cyclic chain being in the preparatory state. When Wired_OR_on>0 and Wired_OR_off>0 are at high level, it indicates that there is a control circuit in the current cyclic chain being in the preparatory state. When Wired_OR_on>0 and Wired_OR_off>0 are at low level, it indicates that there is no control circuit in the current circuit being in the preparatory state. Wired_AND_on<2 and Wired_AND_off<2 indicate whether the number of control circuit in the current cyclic chain being in the preparatory state is less than 2. When Wired_AND_on<2 and Wired_AND_off<2 are at high level, it indicates that the number of control circuit in the current cyclic chain being in the preparatory state is less than 2. When Wired_AND_on<2 and Wired_AND_off<2 are at low level, it indicates that the number of control circuit in the current cyclic chain being in the preparatory state is greater than 2.

Figure 3:
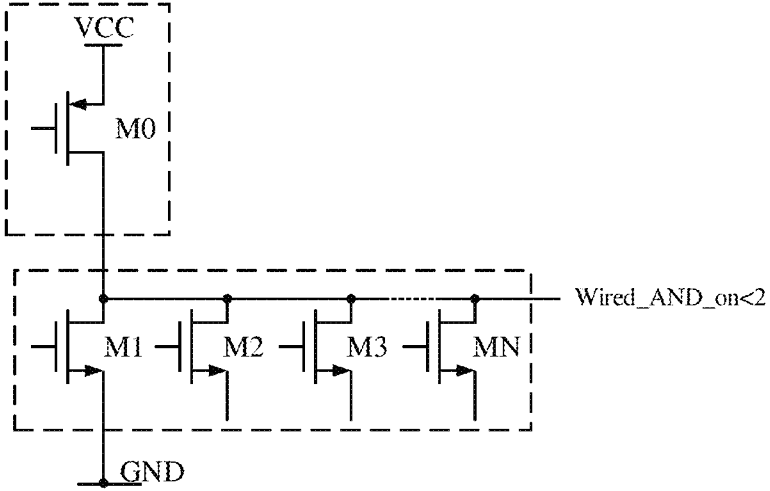
FIG. 3 is a detection circuit with combination of analog and logic for detecting more than one control circuit being in a preparatory state according to an embodiment of the present disclosure.

FIG. 3 is a detection circuit with combination of analog and logic for detecting more than one control circuit being in a preparatory state according to an embodiment of the present disclosure. Transistors M1-MN in FIG. 3 are equivalent to the plurality of control circuits 101~10N. The control circuit being in the preparatory state outputs a linear output of a positive constant current I, and is connected to corresponding outputs of other control circuits at a pull-up load M0 with a positive constant pull-up current of 1.5*I. If only one control circuit is in the preparatory state, the signal Wired_AND_on<2 cannot be at a logic low level, and if more than one control circuits are in the preparatory state, the signal Wired_AND_on<2 is at a logic low level. This analog circuit can not only realize a parasitic state detection in the preparatory state in the cyclic chain, but also has a simple circuit and can greatly reduce the circuit size.

Continuing with reference to FIG. 2, in some embodiments, the control circuit 101A further includes a counter 1014, a phase-cutting controller 1015, and a detection and control module 1016. The counter 1014 is configured to count pulses of clock signal CP_on and/or CP_off in the preparatory state, and obtain the number of pulses at the current time, and then judge the total phase number Total_NO in the cyclic chain at the current time, and transmit the total phase number Total_NO to the host controller 200 through the communication bus. In other embodiments, the multiphase switching converter 100 further includes a common pulse counter. Each control circuit being in a preparatory state acquires a count value of the common pulse counter, and subtracts it from a count value that is acquired last time to obtain the total phase number of in the current cycle chain.

Figure 4:
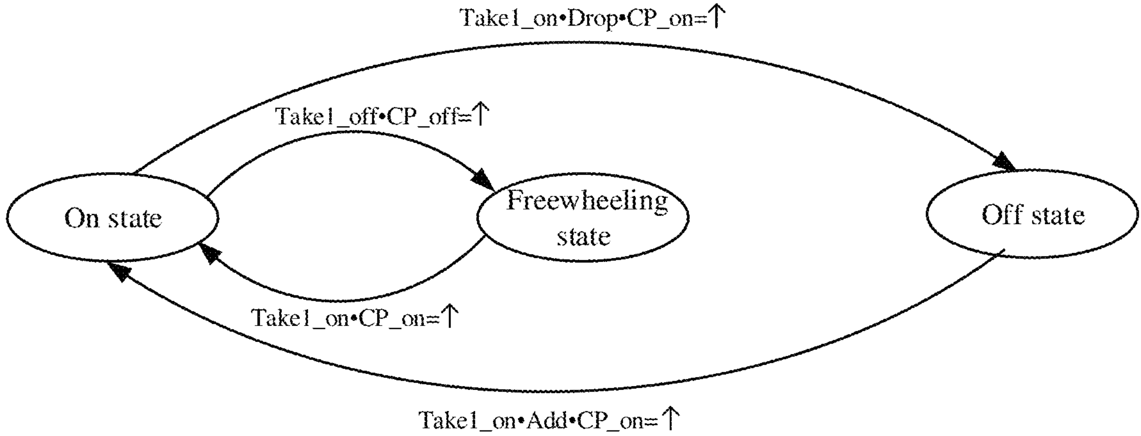
FIG. 4 is a state transition diagram of the control circuit 101A according to an embodiment of the present disclosure.

The phase-cutting controller 1015 is configured to receive phase-cutting instructions Add and Drop from the host controller 200 through the communication bus in the preparatory state, and determine whether the control circuit exit or enter a loop based on the phase-cutting instructions. For example, when the load is too light, the host controller 200 provides a phase-cutting instruction Drop to perform phase reduction operation. When the load is too heavy, the host controller 200 provides phase-cutting instruction Add to carry out phase-adding operation. FIG. 4 shows a state transition diagram of the control circuit 101A according to an embodiment of the present disclosure. As shown in FIG. 4, the control circuit 101A enters the preparatory state when receiving the on-preparatory input signal Take1_on, and judges whether or not the phase-cutting instruction Drop is detected in the preparatory state. If the phase-cutting instruction Drop is received in the preparatory state, the control circuit 101A exits the loop when receiving the on-clock signal CP_on, so that the corresponding switching circuit 111 stops outputting power and the preparatory input signal is equal to the preparatory output signal. When the control circuit 101A is in an off state, it enters the preparatory state when receiving the on-preparatory input signal Take1_on, and judges whether the phase-cutting instruction Add is detected or not in the preparatory state. If the phase-cutting instruction Add is received in the preparatory state, the control circuit 101A enters the loop when receiving the clock signal CP_on, so that the corresponding switching circuit 111 starts to output power. Further, the transition between the freewheeling state and on state of the control circuit 101A in FIG. 4 has been explained above and will not be repeated here.

With reference to FIG. 2, the detection and control module 1016 is configured to compare the current sample signal Irc of the switching circuit 111 with a current threshold value to obtain a comparison result, determine whether an inductor current in the corresponding switching circuit is reversed according to the comparison result, and transmit the inductor current reverse indication signal DCM to the host controller 200 through the communication bus. In addition, the detection and control module 1016 is further configured to receive a threshold setting signal U and a high impedance state control signal Z from the host controller 200 through the communication bus, and set high and low current thresholds of the circuit and switching between the high and low current thresholds according to the threshold setting signal U, and control the switch controller 1011 to output the switching control signal PWM1 at an intermediate level according to the high impedance state control signal Z, so as to allow the switching circuit 111 operate in a high impedance state.

It should be noted that the plurality of control circuits 101 to 10N in FIG. 1 may have the same structure as the circuit shown in FIG. 2, so that a simple and unified chip or circuit can be used to construct the cyclic chain in FIG. 1, which greatly simplifies the circuit design and reduces the circuit cost.

To sum up, the multiphase switching converter provided by embodiments of the present disclosure includes the plurality of control circuits forming the daisy chain architecture, wherein each control circuit is configured to operate in a preparatory state when receiving a preparatory input signal, and to generate a preparatory output signal and a switching control signal for controlling a corresponding switching circuit when receiving a clock signal from a communication bus in the preparatory state. Since the daisy chain architecture is adopted, users can easily adjust the total phase number of multiphase switch according to the needs of specific applications. If the phase number needs to be increased, it only needs to add new control circuit and corresponding external components in the daisy chain architecture.

Further, only preparatory signals are transmitted between the plurality of control circuits in the cyclic chain, and a signal for controlling circuit to be turned on is participated by the clock signal generated by the host controller 200, so that the host controller 200 does not need to track a position of a current unit in real time during a control process of all units, thus greatly simplifying a design of the host controller 200 and reducing a circuit cost.

Further, the multiphase switching converter of embodiments of the present disclosure adopts a unified and simple chip or circuit to construct the cyclic chain, which only requires the control circuits in the cyclic chain to keep sequence, but does not require them to be connected in sequence, so as to simplify the difficulty of circuit modification and greatly reduce the circuit cost.

In the above description, the well-known structural elements and steps are not explained in detail. However, it will be understood by those skilled in the art that the corresponding structural elements and steps can be realized by various technical means. In addition, in order to form the same structural elements those skilled in the art may devise methods that are not exactly the same as those described above. In addition, although the embodiments are described separately above this does not mean that the measures in the embodiments cannot be advantageously used in combination.

These embodiments are not exhaustively described in all detail in accordance with the present disclosure's practices such as the above and are not limiting the disclosure to specific embodiments only. Obviously, according to the above description, many modifications and changes can be made. These embodiments are selected and specifically described in this specification in order to better explain the principle and practical application of the present disclosure, so that technicians in the technical field can make good use of the present disclosure and its modification based on the present disclosure. The scope of protection of the present disclosure rights shall be subject to the scope defined in the present disclosure's claims.

What is claimed is:

1. A multiphase switching converter, comprising:

a plurality of switching circuits coupled in parallel, wherein each switching circuit has an input coupled to an input voltage and an output coupled to a load to provide an output voltage; and a plurality of control circuits, configured in a daisy chain architecture, respectively coupled to the plurality of switching circuits, wherein each control circuit has a first terminal, a second terminal and a third terminal, the first terminal is coupled to the second terminal of a pre-stage control circuit to receive a preparatory input signal, the second terminal is coupled to the first terminal of a post-stage control circuit to provide a preparatory output signal, and the third terminal is coupled to a communication bus to receive a clock signal, wherein each control circuit is configured to operate in a preparatory state when receiving the preparatory input signal, and to generate the preparatory output signal and a switching control signal for controlling a corresponding switching circuit when receiving the clock signal in the preparatory state, wherein each control circuit comprises:

a reset controller, configured to transmit a state feedback signal to a host controller through the communication bus, the host controller judging whether only one control circuit in a cyclic chain is in the preparatory state according to the state feedback signal, wherein the reset controller receives a reset signal from the host controller through the communication bus and executes circuit reset when one or more than one control circuit in the cyclic chain is in the preparatory state, a counter, configured to count pulses of the clock signal in the preparatory state, obtain a total phase number in the cyclic chain at a current time, and transmit the total phase number to the host controller through the communication bus, a phase-cutting controller, configured to receive a phase-cutting instruction from the host controller through the communication bus in the preparatory state, and determine whether to make the corresponding switching circuit stop outputting power or start to output power based on the phase-cutting instruction, and a detection and control module, configured to compare a current sampling signal of the corresponding switching circuit with a current threshold value to obtain a comparison result, judge whether an inductor current in the corresponding switching circuit is reversed according to the comparison result, and transmit an inductor current reverse indication signal to the host controller through the communication bus, wherein the detection and control module is further configured to receive a threshold setting signal from the host controller through the communication bus and set the current threshold value according to the threshold setting signal.

2. The multiphase switching converter according to claim 1, wherein the first terminal of a head control circuit of the plurality of control circuits and the second terminal of a tail control circuit of the plurality of control circuits are coupled to a loopback wire, so as to form a cyclic chain including the plurality of control circuits.

3. The multiphase switching converter according to claim 1, wherein the switching control signal has a high-level state, a low-level state and an intermediate-level state, and the corresponding switching circuit performs actions including turning on an upper transistor, turning on a lower transistor and being in a high-resistance state in response to the high-level state, the low-level state and the intermediate-level state of the switching control signal.

4. The multiphase switching converter according to claim 1, wherein: the preparatory input signal comprises an on-preparatory input signal and a freewheeling preparatory input signal, the preparatory output signal comprises an on-preparatory output signal and a freewheeling preparatory output signal, and the clock signal comprises an on-clock signal and a freewheeling clock signal.

5. The multiphase switching converter according to claim 1, wherein each control circuit further comprises:

a configuration register, configured to determine whether the corresponding control circuit is in the cyclic chain, whether the corresponding control circuit is a head control circuit and whether the corresponding control circuit is a tail control circuit.

6. A control circuit for a multiphase switching converter, wherein the control circuit is coupled with a plurality of other control circuits to form a daisy chain architecture, the multiphase switching converter comprises a plurality of switching circuits coupled in parallel, the control circuit comprises:

a first terminal coupled to a second terminal of a pre-stage control circuit in the daisy chain architecture to receive a preparatory input signal;

a second terminal coupled to a first terminal of a post-stage control circuit in the daisy chain architecture to provide a preparatory output signal;

a third terminal coupled to a communication bus to receive a clock signal, wherein, the control circuit is configured to operate in a preparatory state when receiving the preparatory input signal, and to generate the preparatory output signal and a switching control signal for controlling a corresponding switching circuit when receiving the clock signal in the preparatory state, a reset controller, configured to transmit a state feedback signal to a host controller through the communication bus, the host controller judging whether only one control circuit in a cyclic chain is in the preparatory state according to the state feedback signal, wherein the reset controller receives a reset signal from the host controller through the communication bus and executes circuit reset when one or more than one control circuit in the cyclic chain is in the preparatory state, a counter, configured to count pulses of the clock signal in the preparatory state, obtain a total phase number in the cyclic chain at a current time, and transmit the total phase number to the host controller through the communication bus, a phase-cutting controller, configured to receive a phase-cutting instruction from the host controller through the communication bus in the preparatory state, and judge whether to make the corresponding switching circuit stop outputting power or start to output power based on the phase-cutting instruction, and a detection and control module, configured to compare a current sampling signal of the corresponding switching circuit with a current threshold value to obtain a comparison result, judge whether an inductor current in the corresponding switching circuit is reversed according to the comparison result, and transmit an inductor current reverse indication signal to the host controller through the communication bus, wherein the detection and control module is further configured to receive a threshold setting signal from the host controller through the communication bus and set the current threshold value according to the threshold setting signal.

7. The control circuit according to claim 6, wherein the first terminal of the control circuit is coupled to a loopback wire when the control circuit serves as a head control circuit in the daisy chain architecture, and the second terminal of the control circuit is coupled to the loopback wire when the control circuit serves as a tail control circuit in the daisy chain architecture, so as to form a cyclic chain including the control circuit and the plurality of other control circuits.

8. The control circuit according to claim 6, wherein the switching control signal has a high-level state, a low-level state and an intermediate-level state, and the corresponding switching circuit performs actions including turning on an upper transistor, turning on a lower transistor and being in a high-resistance state in response to the high-level state, the low-level state and the intermediate-level state of the switching control signal.

9. The control circuit according to claim 6, wherein;

the preparatory input signal comprises an on-preparatory input signal and a freewheeling preparatory input signal, the preparatory output signal comprises an on-preparatory output signal and a freewheeling preparatory output signal, and the clock signal comprises an on-clock signal and a freewheeling clock signal.

10. The control circuit according to claim 6, further comprising:

a configuration register, configured to determine whether the corresponding control circuit is in the cyclic chain, whether the corresponding control circuit is a head control circuit and whether the corresponding control circuit is a tail control circuit.

* * * * *